(12) United States Patent
Broniak et al.

(10) Patent No.: US 9,246,332 B2
(45) Date of Patent: Jan. 26, 2016

(54) HOUSEHOLD ENERGY MANAGEMENT SYSTEM AND METHOD FOR ONE OR MORE APPLIANCES AND POWER GENERATOR

(75) Inventors: Jay Andrew Broniak, Louisville, KY (US); Michael Thomas Beyerle, Pewee Valley, KY (US); Joseph Mark Brian, Louisville, KY (US); David C. Bingham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 676 days.

(21) Appl. No.: 12/896,247

(22) Filed: Oct. 1, 2010

(65) Prior Publication Data

US 2012/0065787 A1 Mar. 15, 2012

(51) Int. Cl.
*H02J 3/14* (2006.01)
*H02J 3/38* (2006.01)

(52) U.S. Cl.
CPC ............ *H02J 3/14* (2013.01); *H02J 2003/143* (2013.01); *H02J 2003/388* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
USPC ............ 700/287, 291–293, 295, 296; 307/23, 307/29, 39, 41, 64
See application file for complete search history.

(56) References Cited

U.S. PATENT DOCUMENTS

| 5,761,027 | A * | 6/1998 | Flegel ............................ 361/664 |
| 2003/0075982 | A1 * | 4/2003 | Seefeldt .......................... 307/29 |
| 2004/0078153 | A1 * | 4/2004 | Bartone et al. ................... 702/57 |
| 2010/0010683 | A1 * | 1/2010 | Kates ............................. 700/293 |
| 2010/0019574 | A1 * | 1/2010 | Baldassarre et al. ............. 307/23 |
| 2010/0225167 | A1 * | 9/2010 | Stair et al. ........................ 307/29 |
| 2011/0133655 | A1 * | 6/2011 | Recker et al. .................. 315/159 |
| 2011/0153101 | A1 |  6/2011 | Thomas et al. |
| 2011/0298286 | A1 * | 12/2011 | Batzler et al. ................... 307/41 |

* cited by examiner

*Primary Examiner* — Sean Shechtman
*Assistant Examiner* — Steven Garland
(74) *Attorney, Agent, or Firm* — Dority & Manning, P.A.

(57) ABSTRACT

A device and method for enabling an home energy management (HEM) system to work with a home power generator to run the home in a "survival mode" when the home has lost power from the main utility feed. The HEM controls the operation of the main appliances/loads to enable the homeowner to have basic functionality (hot water, lights, heat, cooking & preserving food) of their home, all while ensuring the max draw on the home does not exceed the output rating of the generator thereby allowing the use of a smaller generator while still providing functionality similar to larger generators resulting in energy and cost savings to the consumer.

19 Claims, 2 Drawing Sheets

HOUSEHOLD ENERGY MANAGEMENT SYSTEM AND METHOD FOR ONE OR MORE APPLIANCES AND POWER GENERATOR

BACKGROUND OF THE DISCLOSURE

The present disclosure relates to energy management, and more particularly to power consuming device control methods and electrical energy consumption systems.

Home energy management (HEM) systems are becoming a key to reducing energy consumption in homes and buildings, in a consumer friendly manner. Existing HEMs are commonly in the form of a special custom configured computer with an integrated display, which communicates to devices in the home and stores data, and also has simple algorithms to enable energy reduction. This type of device may also include a keypad for data entry or the display may be a touch screen. In either arrangement, the display, computer and key pad (if used) are formed as a single unit. This single unit is either integrated in a unitary housing, or if the display is not in the same housing, the display and computer are otherwise connected/associated upon delivery from the factory and/or synchronized or tuned to work as a single unit.

Key functions of a HEM include:
- Creates a network of energy consuming devices within the home,
- Measures the consumption of the whole home/building or individual devices,
- Records and stores energy consumption information in a database, and
- Enables consumer interface with all energy consuming devices in a home to:
  - view consumption data of individual devices
  - set preferences for operation of energy consuming devices at different times during the day or at different energy pricing levels
  - control/program energy consuming devices.

In some installations, an auxiliary power generating source, such as a gas generator is provided to supply power to the appliances and other energy consuming devices during interruptions in utility power.

SUMMARY OF THE DISCLOSURE

A device and method for enabling an HEM system to work with a home power generator to run the home in a "survival mode" when the home has lost power from the main utility feed. The HEM controls the operation of the main appliances/loads to enable the homeowner to have basic functionality (hot water, lights, heat, cooking & preserving food) of their home, all while ensuring the max draw on the home does not exceed the output rating of the generator thereby allowing the use of a smaller generator while still providing functionality similar to larger generators resulting in energy and cost savings to the consumer.

According to one aspect, a home energy management system comprises a plurality of energy consuming devices adapted to receive power from at least one circuit, a generator for supplying power to the at least one circuit for use by the plurality of energy consuming devices when sufficient utility power is unavailable, and a home energy manager having a controller in communication with said plurality of energy consuming devices, the controller configured to actively control one or more aspects of the operation of at least one of the plurality of energy consuming devices such that the total load of the plurality of energy consuming devices does not exceed the capacity of the generator.

The home energy manager can be configured to detect when the generator is supplying power to the circuit and automatically implement a low energy use profile to actively control one or more aspects of the operation of the plurality of energy consuming devices such that the total load of the plurality of energy consuming devices does not exceed the capacity of the generator. The home energy manager can be configured to receive a signal from the generator when the generator is supplying power to the at least one circuit. The controller can be configured to actively control one or more aspects of operation of at least one of the plurality of energy consuming devices by switching off a non-essential energy consuming device. The non-essential energy consuming device can be user-defined. The controller can be configured to actively control one or more aspects of operation of at least one of the plurality of energy consuming devices by switching at least one of the plurality of energy consuming devices to a different state of operation. The different state of operation can be a low power state of operation. The controller can selectively activate a subset of the plurality of energy consuming devices for a first period of time, said subset having a total load less than the capacity of the generator. After the first period of time, the controller can deactivate the first subset and activates a second subset of the plurality of energy consuming devices for a second period of time, said second subset having a total load less than the capacity of the generator.

According to another aspect, a home energy manager comprises: a controller for controlling a plurality of energy consuming devices, and a communications interface for communicating with the plurality of energy consuming devices and a power generator. The controller is configured to receive a signal from the power generator indicating that the power generator is supplying power to the plurality of energy consuming devices and, in response thereto, actively control one or more aspects of the operation of at least one of the plurality of energy consuming devices such that the total load of the plurality of energy consuming devices does not exceed the capacity of the generator.

The home energy manager can be configured to detect an interruption in utility power ordinarily supplied to the plurality of energy consuming devices, and automatically implement a low energy use profile wherein the controller actively controls one or more aspects of the operation of the plurality of energy consuming devices such that the total load of the plurality of energy consuming devices does not exceed the capacity of the generator. The home energy manager can be configured to receive a signal from the utility indicative of a power interruption. The controller can be configured to actively control one or more aspects of operation of at least one of the plurality of energy consuming devices by switching off a non-essential energy consuming device. The non-essential energy consuming device can be user-defined. The controller can be configured to actively control one or more aspects of operation of at least one of the plurality of energy consuming devices by switching at least one of the plurality of energy consuming devices to a different state of operation. The different state of operation can be a low power state of operation. The controller can selectively activate a subset of the plurality of energy consuming devices for a first period of time, said subset having a total load less than the capacity of the generator. After the first period of time, the controller can deactivate the first subset and activates a second subset of the plurality of energy consuming devices for a second period of time, said second subset having a total load less than the capacity of the generator.

According to another aspect, a method for managing a plurality of energy consuming devices being powered by an auxiliary power generator during a utility power interruption, said devices having a combined power rating in excess of a power generating capacity of the power generator, the method comprises the steps of detecting an interruption of utility power, and actively controlling one or more aspects of the operation of at least one of the plurality of energy consuming devices such that the total load of the plurality of energy consuming devices does not exceed the capacity of the generator. The step of actively controlling can include implementing a user-defined low energy use profile.

DETAILED DESCRIPTION OF THE PREFERRED EMBODIMENTS

Figure 1:
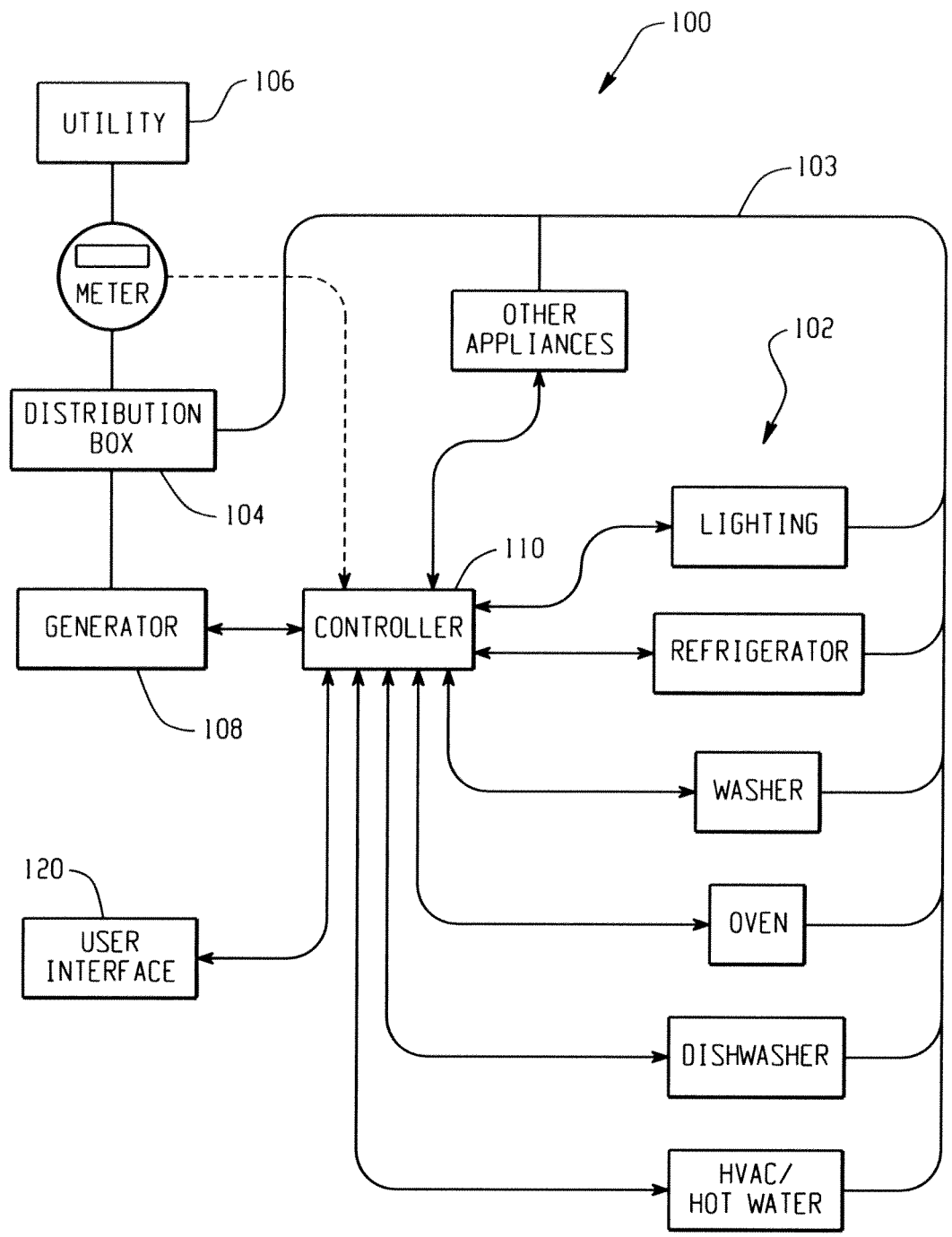
FIG. 1 is a schematic illustration of a household energy management system according to the present disclosure.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a household energy management system 100 for one or more energy consuming devices 102. The term energy consuming devices is used herein to include any electrical loads such as appliances, including typical household appliances such as a refrigerator, dishwasher, washer, dryer, microwave and oven, as well as an HVAC system, water heater and lighting. Although only appliances are illustrated in FIG. 1, it will be appreciated that switched outlets and other household loads are included within the meaning of energy consuming devices. Each energy consuming device 102 is connected to a circuit 103 delivering electricity thereto from a power distribution box 104 (e.g., circuit breaker panel). The power distribution box 104 typically receives electrical power from a power utility 106. An auxiliary generator 108 is connected to the power distribution box 104 and is configured to supply backup or supplementary power in the event of a disruption of service from the utility 106. The generator 108 may be a gas or diesel generator, or any other power generator such as a wind turbine or solar cell bank, for example. In a residential application, a typical generator may have a power rating between 1 kW and 10 kW or more, depending on the size of the home and individual electrical needs of the consumer.

The energy management system 100 also includes a controller 110, also referred to as a "home energy manager" (HEM), for managing power consumption of the one or more energy consuming devices within the household. The controller 110 can include a micro computer on a printed circuit board which is programmed to selectively control the energization of at least one power consuming feature/function of each appliance, etc. The controller 110 can be in signal communication with the energy utility 106, such as an energy supplying utility or a third party utility aggregator, supplying power to the appliances and other household loads via the one or more circuits 103. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by the energy utility, such as a power company, and can be transmitted via a power line, as a radio frequency signal, or by any other means for transmitting a signal when the utility provider desires to reduce demand for its resources. Each appliance 102 has a communication interface that links itself to the controller 110.

The system 100 further includes a control panel or user interface 120, such as a display monitor or touch-screen, operatively connected to the controller 110. The user interface receives energy management input for each energy consuming device or appliance 102 from the user. For example, according to one exemplary embodiment, the controller 110 includes a memory that stores past usage data, present usage data, and can also be programmed to store a selected response or mode of operation for each appliance depending on the data received from the energy utility. The user interacts with the controller through the user interface 120 to either receive messages and/or input data into the controller 110.

The controller 110 includes predefined operating modes or user profiles, such as a peak demand mode, an off-peak demand mode, an away mode, a vacation mode and a survival mode. Each predefined user profile is associated with a predetermined parameter of energy usage for each appliance, such as a maximum energy usage and/or a maximum energy cost for each appliance. Examples of predefined user profiles for several appliances are provided in the table below.

| Appliance | Predefined User Profile |
|---|---|
| HVAC | Normal Mode—setpoint temperature per homeowner's settings |
| | Energy Savings Mode—setpoint temperature shifted up/down by "x" degrees |
| Refrigerator | Normal Mode—setpoint temperature per homeowner's settings; all features working |
| | Energy Savings Mode—setpoint temperature shifted up/down by "x" degrees; certain features delayed or disabled such as "quick chill" |
| Hot water heater | Normal Mode—setpoint temperature per homeowner's settings, typically 130 F. |
| | Energy Savings Mode, Level 1—setpoint temperature shifted to 120 F. |
| | Energy Savings Mode, Level 2—setpoint temperature shifted to 100 F. |

It should be appreciated that the controller 110 can be configured with default settings which govern normal mode and energy savings mode operation. Such settings in each mode can be fixed while others adjustable to provide response to load shedding signals. In addition to the predefined user profiles, the controller 110 is configured to allow the user to create at least one unique user profile via the user interface 120. The unique user profile has a user selected parameter of energy usage for at least one appliance. In use, the user may select one of the predefined user profiles or the unique user profile via the user interface 120 for each appliance. The controller 110 at least one of controls and operates each appliance 102 in one of a plurality of operating modes, including at least a normal operating mode and an energy savings mode, in response to the input received by the user via the user interface in conjunction with the received signal. According to one exemplary embodiment, to reduce power consumption of each appliance in the energy savings mode, the controller 110 selectively adjusts and/or disables at least one power consuming feature/function of each appliance. Further details of the home energy management system are set forth in commonly-assigned U.S. patent application Ser.

No. 12/644,812 filed on Dec. 22, 2009, which is hereby incorporated herein by reference in its entirely.

The foregoing functions of the home energy management system can be applied in systems having power generation devices, such as a gas or diesel generator, to manage household loads so as to avoid overloading the generator. The controller 110 can be configured to detect when the generator is supplying power to the home power circuit. When the controller 110 receives a signal or otherwise detects that the generator is supplying power to the system as opposed to the utility, the controller 110 can implement a survival mode that limits household energy usage to avoid exceeding the capacity of the generator.

For example, within the user interface 120 of the system 100 an option screen is provided for placing the system into an extremely low whole home consumption mode or "survival mode". The controller 110 will read the power generated by the home's backup generator (or alternately, the power rating of the generator could be a configuration setting in the Energy Manager) and run the control algorithm to manage the main home's loads to operate within this limit.

An exemplary survival mode can include, but is not limited to:

Shifting refrigerator and freezer setpoints thus reducing the overall electrical consumption of the appliance while preventing food spoilage.

Running a hybrid water heater having a heat pump and a conventional heating element, such as GE's Hybrid Electric Geo-Spring Water Heater, in heat pump only mode. This low energy consumption mode will provide the homeowner with hot water while slightly impacting recovery time. Other options include adjusting the setpoint of the water heater.

Adjusting HVAC thermostat setpoints. The controller 110 can adjust the home's thermostat setpoint while still keeping the home at a comfortable level. It will also look to suspend/turn off other main loads in order to overcome the high starting current of the blower motor. After this current drops the controller can then re-enable the other loads.

Reducing the max power consumption of an electric range/cooktop. The max power level will be reduced allowing the homeowner to still cook however it would prolong the cooking cycle.

In view of the foregoing, a control algorithm for controlling a home energy management system operating with a 1 kW continuous (1.5 kW instantaneous) generator can include:

1) Run hot water heater for one hour.
2) Turn off hot water heater
3) Adjust setpoints on Refrigerator down to enable compressor for one hour.
4) Adjust refrigerator back to high setpoint (turn off).
5) Enable HVAC system blower fan (via command sent to thermostat) on furnace to enable heating for one hour.
6) Turn off HVAC blower fan.
7) Activate next load, etc.

Figure 2:
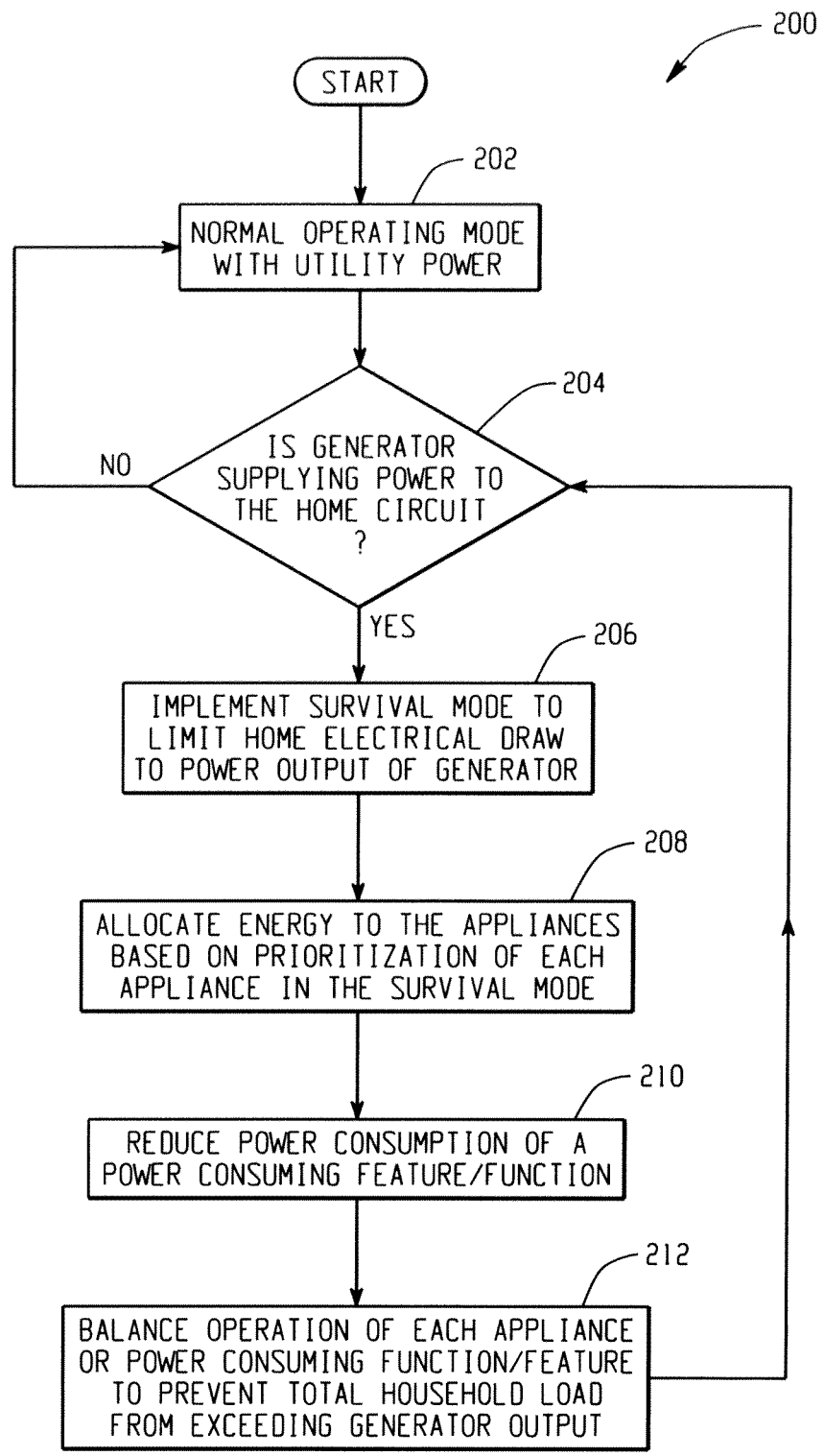
FIG. 2 is an exemplary operational flow chart for the household energy management system of FIG. 1.

Referring now to FIG. 2, a flowchart illustrating an exemplary method in accordance with the present disclosure will be described. The method begins in process step 202 wherein the home energy management system is operating in a normal mode with the appliances and other energy consuming devices receiving power from a utility or other primary source. In process step 204, the system determines whether the generator is supplying power to the residential circuit and, if so, implements the survival mode energy management routine.

Step 204 can be carried out by the generator sending a signal to the controller indicating it is online, or the controller or other device could be configured to detect the interruption of utility power. In the latter case, the system can be configured to automatically implement the survival mode settings until such time as the utility power is restored, thereby assuming that the generator is supplying backup power. Thus, it is possible to "detect" the operation of the generator without receiving a signal from the generator itself. Moreover, other methods of detection could be employed, such as sensing a phase, voltage, etc. indicative of the generator being online. Of course, a user could also manually implement the survival mode when the generator is online.

Once the survival mode is implemented in process step 206, operation of the various energy-consuming devices, appliances etc. are managed in order to avoid overloading the generator. For example, in process step 208, energy is allocated to the appliances etc. based on a priority or as otherwise dictated by the survival mode. In process step 210, one or more energy consuming functions and/or devices can be placed in a low energy mode, or switched off. In process step 212 operation of each appliance or power consuming function feature/device is balanced to prevent the total household load from exceeding generator output.

As will be appreciated, the survival mode implemented in steps 206, 208, 210 and 212 will typically remain in place until such time as the utility power is restored. Thus, the process loops continually back to step 204 until such time as the generator is no longer supplying power to the circuit thereby indicating that the utility power has been restored. Once restored, the process reverts to step 202 and the normal operating mode is once again implemented.

It will be understood that virtually any desired algorithm could be employed as a "survival mode" depending on the amount of available power. For low power generators, typically more management will be involved to ensure that the various loads do not exceed the generator's capacity. With high power generators, less management may be needed.

It will further be understood that the generator provides an auxiliary power source in the event utility power is disrupted or otherwise unavailable. Common generators are typically powered by gas, propane, or diesel. While the present description refers to a generator, any auxiliary power source could be used in place of the generator. This includes wind-powered generators, solar cells or even a bank of one or more batteries. Further, aspects of the disclosure are applicable to systems that utilize a generator as a primary power source (e.g., off-grid installations) wherein energy demand management can be utilized to enable smaller generators to provide similar functionality only previously achieved through the use of a respectively larger generator.

The low energy "survival" mode described herein can also be implemented manually by a consumer by selecting such mode through the HEM. This can be useful for installation where a generator is not in communication with the HEM but is nevertheless connected to the home circuit for supplying power thereto. In such an arrangement, the consumer can input the maximum power rating for the generator, and implement the survival mode as needed.

It should now be understood that the present disclosure enables a homeowner with the ability to stay in their home if it has lost the main power feed from the utility by optimizing the usage of power supplied by a backup generator to allow the major loads within the home to still function (hot water, lights, heat, cooking & preserving food, etc.).

It will also provide the homeowner the ability to enable more devices than what the generator would otherwise be capable of powering. By controlling which devices/loads/functions are activated, and when, the loads can be duty cycles about each other, thus enabling more devices to be active.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A home energy management system comprising:
   a plurality of energy consuming devices adapted to receive power from at least one circuit;
   a generator for supplying power to the at least one circuit for use by the plurality of energy consuming devices when sufficient utility power is unavailable; and
   a home energy manager having a controller in communication with said plurality of energy consuming devices, the controller configured to actively control one or more aspects of the operation of at least one of the plurality of energy consuming devices such that the total load of the plurality of energy consuming devices does not exceed a capacity of the generator;
   wherein the controller is further configured to detect when the generator is supplying power to the at least one circuit and to automatically implement a user-defined low energy use profile such that the total load of the plurality of energy consuming devices does not exceed the capacity of the generator while the low energy use profile is implemented; and
   wherein implementing the low energy use profile selectively adjusts at least one user-defined power consuming feature or function of one or more of the plurality of energy consuming devices without turning off the one or more of the plurality of energy consuming devices, thereby reducing an amount of power consumed by the plurality of energy consuming devices relative to an amount of power consumed by the plurality of energy consuming devices when sufficient utility power is available.

2. A home energy management system as set forth in claim 1, wherein the home energy manager is configured to receive a signal from the generator when the generator is supplying power to the at least one circuit.

3. A home energy management system as set forth in claim 1, wherein the controller is configured to actively control one or more aspects of operation of at least one of the plurality of energy consuming devices by switching off a non-essential energy consuming device.

4. A home energy management system as set forth in claim 3, wherein the non-essential energy consuming device is user-defined.

5. A home energy management system as set forth in claim 1, wherein the controller is configured to actively control one or more aspects of operation of at least one of the plurality of energy consuming devices by switching at least one of the plurality of energy consuming devices to a different state of operation.

6. A home energy management system as set forth in claim 5, wherein the different state of operation is a low power state of operation.

7. A home energy management system as set forth in claim 1, wherein the controller selectively activates a first subset of the plurality of energy consuming devices for a first period of time, said first subset having a total load less than the capacity of the generator.

8. A home energy management system as set forth in claim 7, wherein, after the first period of time, the controller deactivates the first subset and activates a second subset of the plurality of energy consuming devices for a second period of time, said second subset having a total load less than the capacity of the generator.

9. A home energy management system as set forth in claim 8, wherein the first period of time and the second period of time are predetermined.

10. A home energy manager comprising:
    a controller for controlling a plurality of energy consuming devices; and
    a communications interface for communicating with the plurality of energy consuming devices and a power generator;
    wherein the controller is configured to receive a signal from the power generator indicating that the power generator is supplying power to the plurality of energy consuming devices and, in response thereto, actively control one or more aspects of the operation of at least one of the plurality of energy consuming devices such that the total load of the plurality of energy consuming devices does not exceed a capacity of the generator;
    wherein the controller is further configured to detect an interruption in utility power ordinarily supplied to the plurality of energy consuming devices, and automatically implement a user-defined low energy use profile such that the total load of the plurality of energy consuming devices does not exceed the capacity of the generator while the low energy use profile is implemented; and
    wherein implementing the low energy use profile selectively adjusts at least one user-defined power consuming feature or function of one or more of the plurality of energy consuming devices without turning off the one or more of the plurality of energy consuming devices, thereby reducing an amount of power consumed by the plurality of energy consuming devices relative to an amount of power consumed by the plurality of energy consuming devices when utility power is supplied to the plurality of energy consuming devices.

11. A home energy manager as set forth in claim 10, wherein the home energy manager is configured to receive a signal from the utility indicative of a power interruption.

12. A home energy manager as set forth in claim 10, wherein the controller is configured to actively control one or more aspects of operation of at least one of the plurality of energy consuming devices by switching off a non-essential energy consuming device.

13. A home energy manager as set forth in claim 12, wherein the non-essential energy consuming device is user-defined.

14. A home energy manager as set forth in claim 10, wherein the controller is configured to actively control one or more aspects of operation of at least one of the plurality of energy consuming devices by switching at least one of the plurality of energy consuming devices to a different state of operation.

15. A home energy manager as set forth in claim 14, wherein the different state of operation is a low power state of operation.

16. A home energy manager as set forth in claim 10, wherein the controller selectively activates a first subset of the plurality of energy consuming devices for a first period of time, said first subset having a total load less than the capacity of the generator.

17. A home energy manager as set forth in claim 16, wherein, after the first period of time, the controller deactivates the first subset and activates a second subset of the plurality of energy consuming devices for a second period of time, said second subset having a total load less than the capacity of the generator.

18. A home energy manager as set forth in claim 17, wherein the first period of time and the second period of time are predetermined.

19. A method for managing a plurality of energy consuming devices being powered by an auxiliary power generator during a utility power interruption, said devices having a combined power rating in excess of a power generating capacity of the power generator, the method comprising:
   detecting an interruption of utility power; and
   actively controlling one or more aspects of the operation of at least one of the plurality of energy consuming devices such that the total load of the plurality of energy consuming devices does not exceed the capacity of the generator;
   wherein the step of actively controlling includes automatically implementing a user-defined low energy use profile responsive to the detecting step wherein the total load of the plurality of energy consuming devices does not exceed the capacity of the generator while the low energy use profile is implemented; and
   wherein implementing the low energy use profile selectively adjusts at least one user-defined power consuming feature or function of one or more of the plurality of energy consuming devices without turning off the one or more of the plurality of energy consuming devices, thereby reducing an amount of power consumed by the plurality of energy consuming devices relative to an amount of power consumed by the plurality of energy consuming devices when utility power is supplied to the plurality of energy consuming devices.

* * * * *